United States Patent

Ganzel

[11] Patent Number: 6,079,797
[45] Date of Patent: Jun. 27, 2000

[54] DUAL ACTION BALL SCREW PUMP

[75] Inventor: Blaise J. Ganzel, Ann Arbor, Mich.

[73] Assignee: Kelsey-Hayes Company, Livonia, Mich.

[21] Appl. No.: 09/248,972

[22] Filed: Feb. 12, 1999

Related U.S. Application Data

[63] Continuation of application No. PCT/US97/14387, Aug. 13, 1997.
[60] Provisional application No. 60/023,684, Aug. 13, 1996.

[51] Int. Cl.[7] ............................................. B60T 8/40
[52] U.S. Cl. .................................. 303/116.4; 303/116.1; 417/251; 417/254
[58] Field of Search .......................... 303/113.2, 115.2, 303/116.4, 116.3, 116.1, 115.1, 115.4, 113.3, 116.2; 417/251, 252, 254, 253

[56] References Cited

U.S. PATENT DOCUMENTS

| | | | |
|---|---|---|---|
| 1,858,036 | 5/1932 | Brown | 417/253 |
| 2,155,384 | 8/1939 | Carr | 60/650 |
| 2,948,222 | 8/1960 | Pine | 417/251 |
| 4,761,118 | 8/1988 | Zanarini | 417/254 |
| 4,822,115 | 4/1989 | Farr | 303/116.3 |
| 4,883,409 | 11/1989 | Strohmeier et al. | 417/43 |
| 4,896,552 | 1/1990 | Virga | 74/89.15 |
| 4,938,543 | 7/1990 | Parker et al. | 303/113.2 |
| 5,004,403 | 4/1991 | Culbertson et al. | 417/53 |
| 5,015,046 | 5/1991 | Bissell | 303/118.1 |
| 5,029,950 | 7/1991 | Vennemeyer et al. | 303/115.2 |
| 5,147,116 | 9/1992 | Parker et al. | 303/115.2 |
| 5,188,436 | 2/1993 | Devall | 303/113.2 |
| 5,253,981 | 10/1993 | Yang et al. | 417/3 |
| 5,309,553 | 5/1994 | Burgdorf et al. | 303/116.4 |
| 5,328,257 | 7/1994 | Tsukamoto | 303/115.2 |
| 5,415,489 | 5/1995 | Hutchins et al. | 303/115.2 |
| 5,641,209 | 6/1997 | Kushi et al. | 303/9.69 |
| 5,788,341 | 8/1998 | Penrod et al. | 303/115.2 |

FOREIGN PATENT DOCUMENTS

62-214042  9/1987  Japan .

*Primary Examiner*—Robert J. Oberleitner
*Assistant Examiner*—Thomas J. Williams
*Attorney, Agent, or Firm*—MacMillan, Sobanski & Todd, LLC; A. Michael Tucker

[57] ABSTRACT

A ball screw pump assembly includes a pump body having an axial bore defining a travel chamber and a pressure chamber. An input port and an output port are formed in the pressure chamber. A ball screw is provided in the travel chamber. A piston is connected to the ball screw and slidably extends into the pressure chamber as the ball screw is rotated. The piston divides the pressure chamber into an input chamber having a maximum volume and an output chamber having a maximum volume which is less than the maximum of the input chamber. The ball screw pump assembly can be used in a vehicular braking system.

12 Claims, 7 Drawing Sheets

DUAL ACTION BALL SCREW PUMP

CROSS REFERENCE TO RELATED APPLICATIONS

This is a continuation of an international patent application identified as International Application No. PCT/US97/14387, filed Aug. 13, 1997, published as International Publication No. WO 98/06612 on Feb. 19, 1998, and claims the benefit of U.S. provisional patent application identified as application Ser. No. 60/023,684, filed Aug. 13, 1996.

BACKGROUND OF THE INVENTION

This invention relates in general to a pump and in particular to a ball screw pump for use in a pressurized fluid system, including vehicular Antilock/Traction Control/ Vehicle Stability Control braking systems.

Vehicles are commonly slowed and stopped with hydraulic braking systems. These systems vary in complexity but a base brake system typically includes a master cylinder, pressure fluid conduit, and a wheel brake cylinder. The master cylinder generates hydraulic forces by pressurizing brake fluid when the driver applies a brake pedal. The pressurized fluid travels through the pressure fluid conduit to actuate the brake cylinders at the wheels and slow the vehicle.

Vehicle braking systems have evolved beyond the base braking system to provide improved brake pressure regulation resulting in increased versatility. Anti-lock Braking Systems (ABS) provide decreased stopping distances and controlled braking under adverse conditions. An ABS system monitors wheel rotational behavior and regulates the brake pressure in the corresponding wheel brakes in order to maintain the wheel speed within a selected slip range while achieving maximum braking forces. A Traction Control (TC) system controls excessive wheel slip during acceleration to improve vehicle traction. A Vehicle Stability Control (VSC) system automatically actuates selective wheel brakes to counteract dynamic forces generated during cornering which improves vehicle stability.

Typical ABS/TC/VSC systems use a motor driven pump to provide pressurized fluid used to actuate the wheel brake cylinders. The pump must provide a sufficient capacity of fluid at high pressure for these braking systems to operate properly. Pump noise is a common problem for pumps meeting the pressure and capacity requirement of vehicle braking systems. A noisy pump can be displeasing to the driver. Additionally, many pumps produce undesirable large pressure pulses which can be felt by the driver.

It would be desirable to provide a pump for use in vehicular braking systems that is quiet and produces a smooth high pressure output without pressure spikes.

SUMMARY OF THE INVENTION

This invention relates to a dual action ball screw pump for pressurized fluid systems, including vehicular ABS/TC/VSC braking systems. The pump can also be used in active and partially active suspension systems or any other use requiring pressurized fluid. The pump provides quiet, smooth operation by using a dual action piston attached to a nut which is reciprocated on a ball screw. The pump has an input chamber and an output chamber having approximately half the volume of the input chamber. The piston produces an input stroke when moved in one direction and outputs fluid when moved in either direction.

In a preferred embodiment, a pump assembly includes a pump body having an axial bore defining a travel chamber and a pressure chamber. An input port and an output port are formed in the pressure chamber. A ball screw is provided in the travel chamber. A piston is connected to the ball screw and slidably extends into the pressure chamber as the ball screw is rotated. The piston divides the pressure chamber into an input chamber having a maximum volume and an output chamber having a maximum volume which is less than the maximum of the input chamber.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
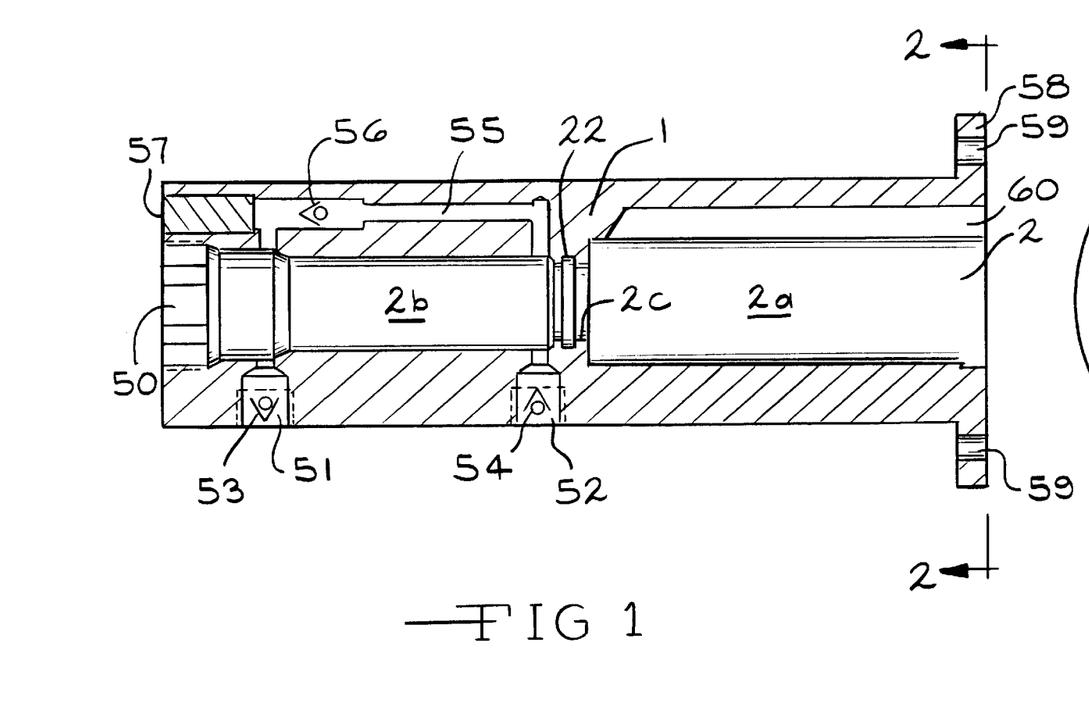
FIG. 1 is an axial sectional view of a pump body according to this invention illustrating a travel chamber and a pressure chamber.

A preferred embodiment of a ball screw pump according to the present invention is illustrated in FIGS. 1–5. Referring now to FIG. 1, the pump body 1 is shown having an axial bore 2 formed therein. The bore 2 has a first portion having a larger inner diameter which forms a travel chamber 2a, a second portion having a smaller inner diameter which forms a pressure chamber 2b, and an intermediate portion having the smallest diameter forming shoulder 2c. An annular groove 22 is formed in the shoulder 2c.

A plug 50 is inserted into the end of the pressure chamber 2b. An input port 51 and output port 52 are formed through the body 1 into the pressure chamber 2b. The input port 51 has a one-way check valve 53 which allows fluid to flow only into the pressure chamber 2b. The output port 52 has a one-way check valve 54 which allows fluid to flow only out of the pressure chamber 2b.

A conduit 55 connects the left and right ends of the pressure chamber 2b. A one-way check valve 56 allows fluid to flow only from the left end to the right end of the pressure chamber 2b. A plug 57 is pressed into the end of conduit 55. The body has a flange 58 with through holes 59. An axial groove 60 is formed in the wall of the travel chamber 2a.

Figure 2:
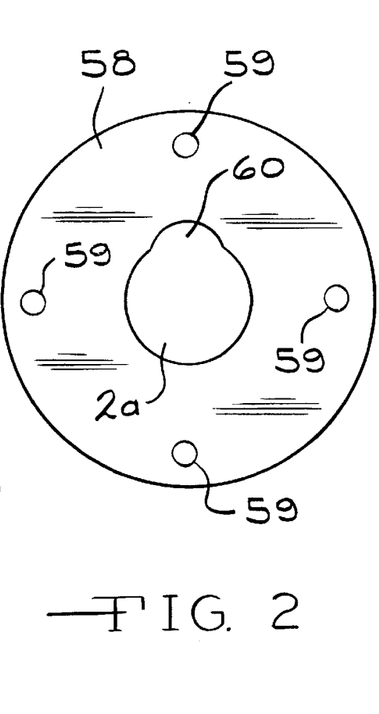
FIG. 2 is an end view of the pump body of FIG. 1.

FIG. 2 illustrates an end view of the pump body 1. The bore 2 forming the travel chamber 2a is preferably formed concentrically with the flange 58. The axial groove 60 is shown in the upper portion of the bore 2.

Figure 3:
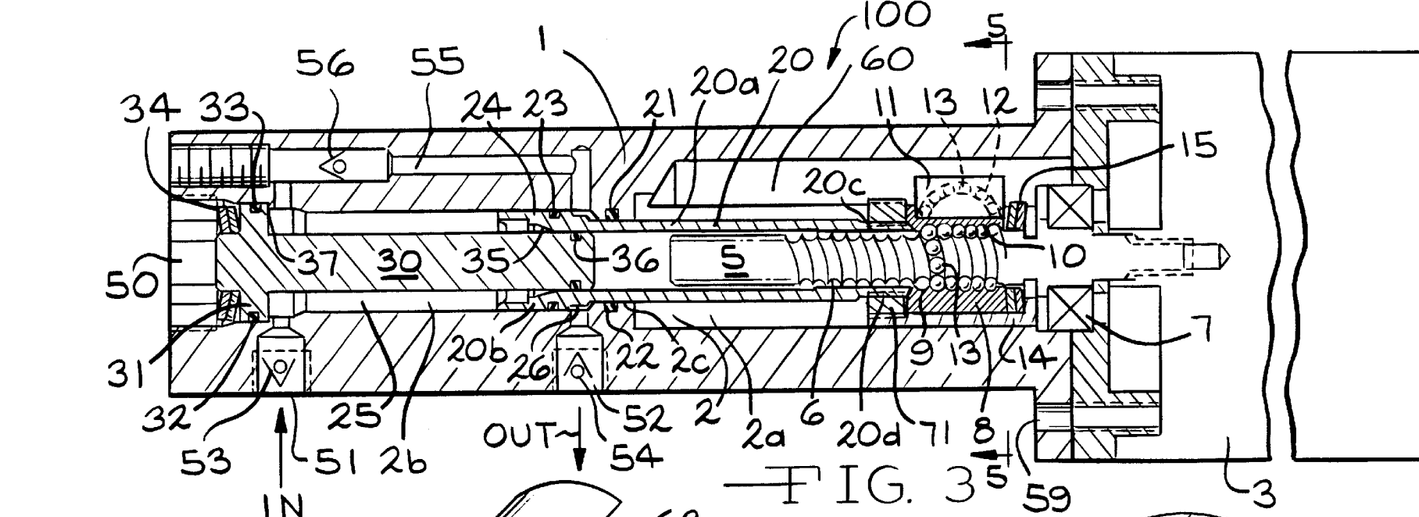
FIG. 3 is an axial sectional view of a pump assembly according to this invention mounted on the pump body of FIGS. 1 and 2.

Referring now to FIG. 3, a pump assembly 100 is shown. A motor 3 is attached to the body 1 by bolts (not shown) through holes 59. A cylindrical ball screw 5 is provided within the travel chamber 2a. A spiral groove 6 extends over most of the outer circumference of the ball screw 5. A bearing 7 supports the ball screw 5 where it attaches to the motor shaft (not shown). A nut 8 having a central through bore 9 is located on the ball screw 5 in the travel chamber 2a.

Complementary grooves 10 are formed on the inner surface of the nut bore 9 which correspond to the ball screw grooves 6. Friction reducing balls 13 are located between the nut grooves 10 and screw grooves 6. The balls 13 engage both the screw 5 and the nut 8 and transfer torque therebetween. A cap 11 is formed on a portion of the outer periphery of the nut 8. The cap 11 has a spiral conduit 12 connecting the grooves 10 on the left and right sides of the nut 8 thereby forming a return path for the balls 13.

A hollow cylindrical piston 20 has a first portion 20a extending into both the travel chamber 2a and the pressure chamber 2b and a second portion 20b housed in the pressure chamber 2b. The outer diameter of the first portion 20a is slightly smaller than the diameter of the shoulder 2c. An O-ring seal 21 is located in the annular groove 22 in the shoulder 2c to prevent fluid in the pressure chamber 2b from entering the travel chamber 2a. The second piston portion 20b has an outer diameter slightly smaller than the inner diameter of the pressure chamber 2b. A second O-ring seal 23 is located in a groove 24 in the second piston portion 20b. The seal 23 divides the pressure chamber 2b into an input chamber 25 and an output chamber 26 and prevents fluid from flowing around the second piston portion 20b and moving between chambers 25 and 26.

A cylindrical guide pin 30 is located in the pressure chamber 2b and includes a shoulder 31. A third O-ring 32 is located in a circumferential channel 33 in the guide pin shoulder 31 and forms a fluid tight seal at the end of the pressure chamber 2b. Belleville springs 34 are located between the shoulder 31 and the plug 50 for cushioning movement of the guide pin 30 towards the plug 50. A shoulder 37 is formed in the wall of the pressure chamber 2b. The guide pin shoulder 31 abuts the pressure chamber shoulder 37 to prevent movement of the guide pin 30 to the right. The end of the guide pin 30 opposite the shoulder 31 extends within the piston 20 and has a circumferential channel 35. A fourth O-ring 36 is seated in the channel 35 and forms a fluid-tight seal between the guide pin 30 and the piston 20.

Figure 4:
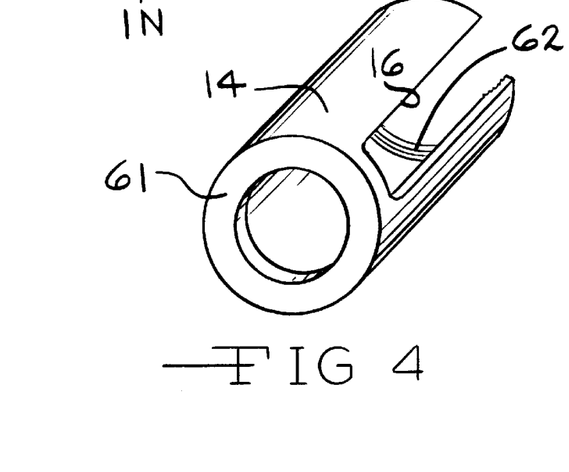
FIG. 4 is an enlarged perspective view of a cage of the pump assembly of FIG. 3 removed from the pump assembly for clarity of illustration.

The piston 20 is connected to the nut 8 by a hollow cylindrical cage 14. The cage 14 is shown in FIG. 4 removed from assembly 100. The cage 14 is a cylindrical member having a shoulder 61 at one end and internal threads 62 at the other end. An axial cut-out 16 extends along a substantial portion the length of the cage 14. The cage 14 surrounds the nut 8 and the shoulder 61 holds belleville springs 15 near the nut 8. The cap 11 extends through the cut-out 16. The first piston portion 20a has an end 20c with external threads 20d. A connecting nut 71 having both internal and external threads (not shown) is screwed onto the piston end 20c. This nut 71 is then screwed into internal threads 62 of the cage 14, thereby connecting the piston 20 to the cage 14. The cage shoulder 61 confines the nut 8 within the cage 14, thereby connecting the piston 20 to the nut 8 for reciprocal movement.

Figure 5:
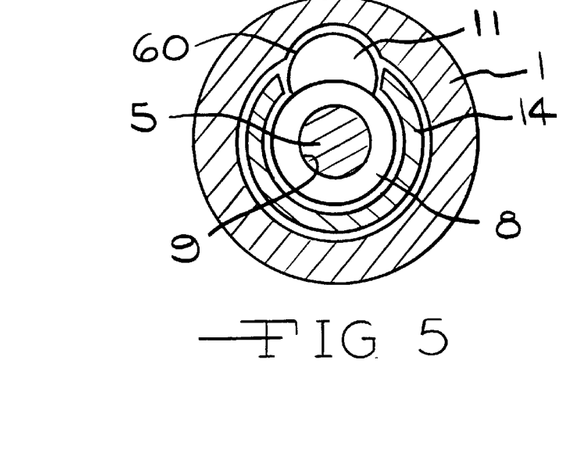
FIG. 5 is a sectional view of the pump assembly taken along line 5—5 of FIG. 3.

Referring now to FIG. 5, the nut 8 is shown on the ball screw 5. The cage 14 coaxially surrounds the nut. The cap 11 protrudes through the cut-out 16 in the cage 14. The cap 11 also protrudes into the groove 60 formed in the pump body 1.

The operation of the pump shall now be described. The motor 3 turns the ball screw 5. The nut cap 11 abuts defining walls of groove 60 and the nut 8 is prevented from rotating with the ball screw 5. The rotating ball screw 5 causes the nut 8 to be displaced axially along the length of the ball screw 5. As the ball screw 5 turns and the nut 8 moves, the balls 13 move in a path between grooves 6 and 10. The continuous path extends from the first end of the conduit 12, around the screw 5 and into the second end of the conduit 12.

The direction in which the nut 8 moves depends on the direction of rotation of the ball screw 5. The cage 14 connects the piston 20 to the nut 8 so the piston 20 is moved left or right with the nut 8 as the motor turns. The piston 20 is reciprocated back and forth by reversing the direction of the motor 3.

When the piston 20 moves from the left end of the pressure chamber 2b to right end, fluid is drawn through the check valve 53 and into the input chamber 25. The second piston portion 20b is moved to the right most end of the pressure chamber 2b thereby drawing the maximum amount of fluid through input port 51. The belleville springs 15 prevent the nut 8 from jamming as the nut 8 travels to the right side of the travel chamber 2a. The input chamber 25 has now reached maximum volume approximately equaling the volume of the pressure chamber bore 2b minus the volume occupied by the guide pin 30. When the piston 20 moves right, the fluid in the output chamber 26 is prevented from entering the input chamber 25 by check valve 56. Instead, the fluid is forced through check valve 54 and out the output port 52.

The output chamber 26 is largest when the piston 20 is at the left most end of the pressure chamber 2b. At this position, the output chamber 26 is approximately equal to the volume of the pressure chamber bore 2b minus the volume occupied by the piston 20. The maximum volume of the output chamber 26 is approximately half the maximum volume of the input chamber 25.

When the piston 20 moves from right to left, fluid in the input chamber 25 is forced into the output chamber 26 through conduit 55 and check valve 56. Half of the fluid from the input chamber 25 is forced out the output port 52 because the maximum volume of the output chamber 26 is only half as large as the maximum volume of the input chamber 25.

Figure 6:
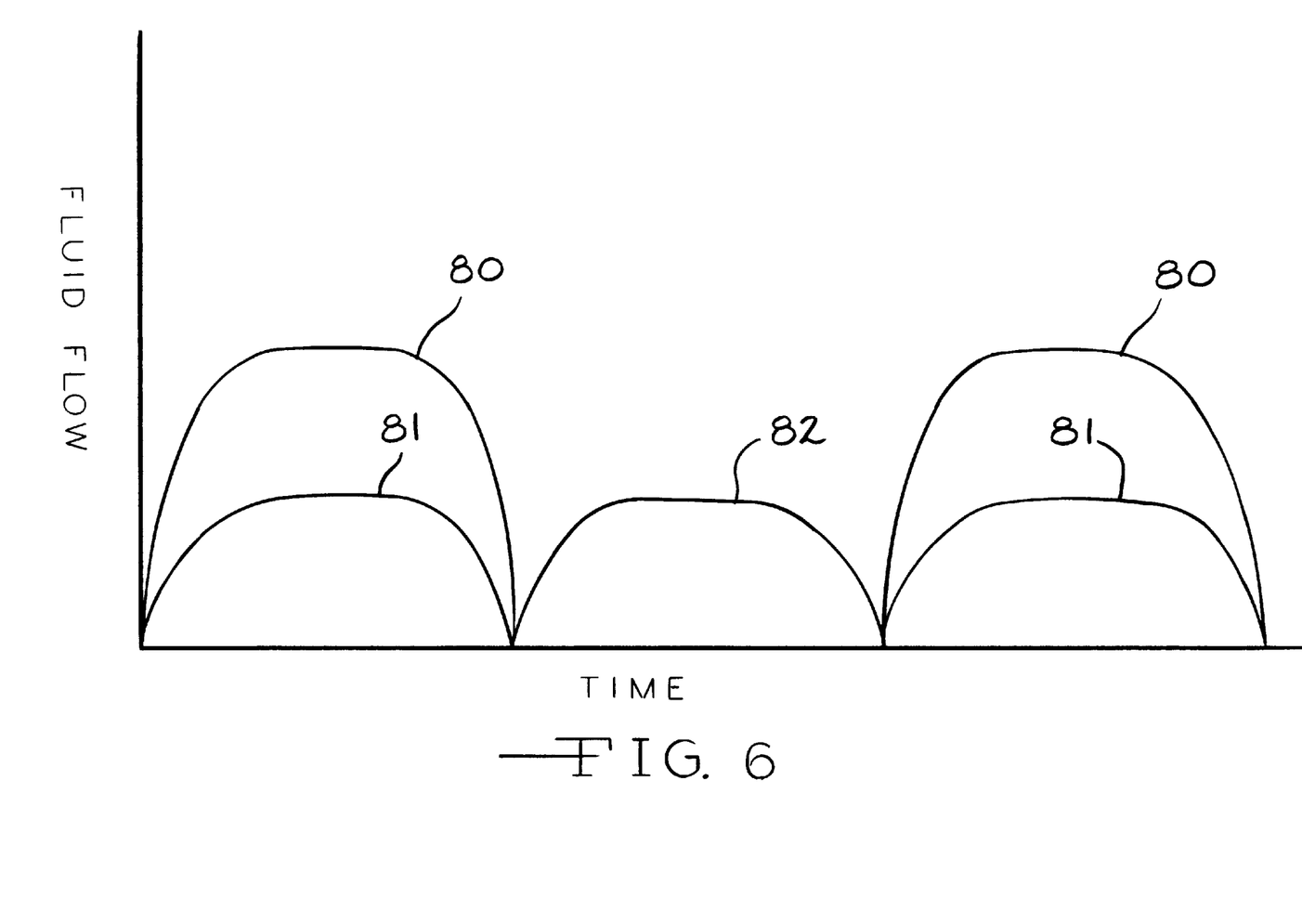
FIG. 6 is a graph illustrating fluid flow into and out of the pump assembly versus time.

FIG. 6 illustrates a graphical representation of the fluid flow both into and out of the pump assembly 100. Line 80 is the fluid flow into the pump 100 through the input port 51 when the piston 20 moves from left to right. Line 81 is the flow out of the pump 100 through the output port 52 during this time. Line 82 is the flow out of the outlet port 52 when the piston 20 moves from right to left.

This dual action ball screw pump 100 provides high pressures with quiet operation. The ball screw 5 is directly driven by the pump motor 3 eliminating a prior art gear which further reduces noise. The output flow a is smooth and free of pressure spikes as illustrated in FIG. 6. It will be appreciated that a single action ball screw pump is contemplated within this invention. For example, by removing check valve 54 at the output port 52, the ball screw pump 100 will function as a single action ball screw pump.

Figure 7:
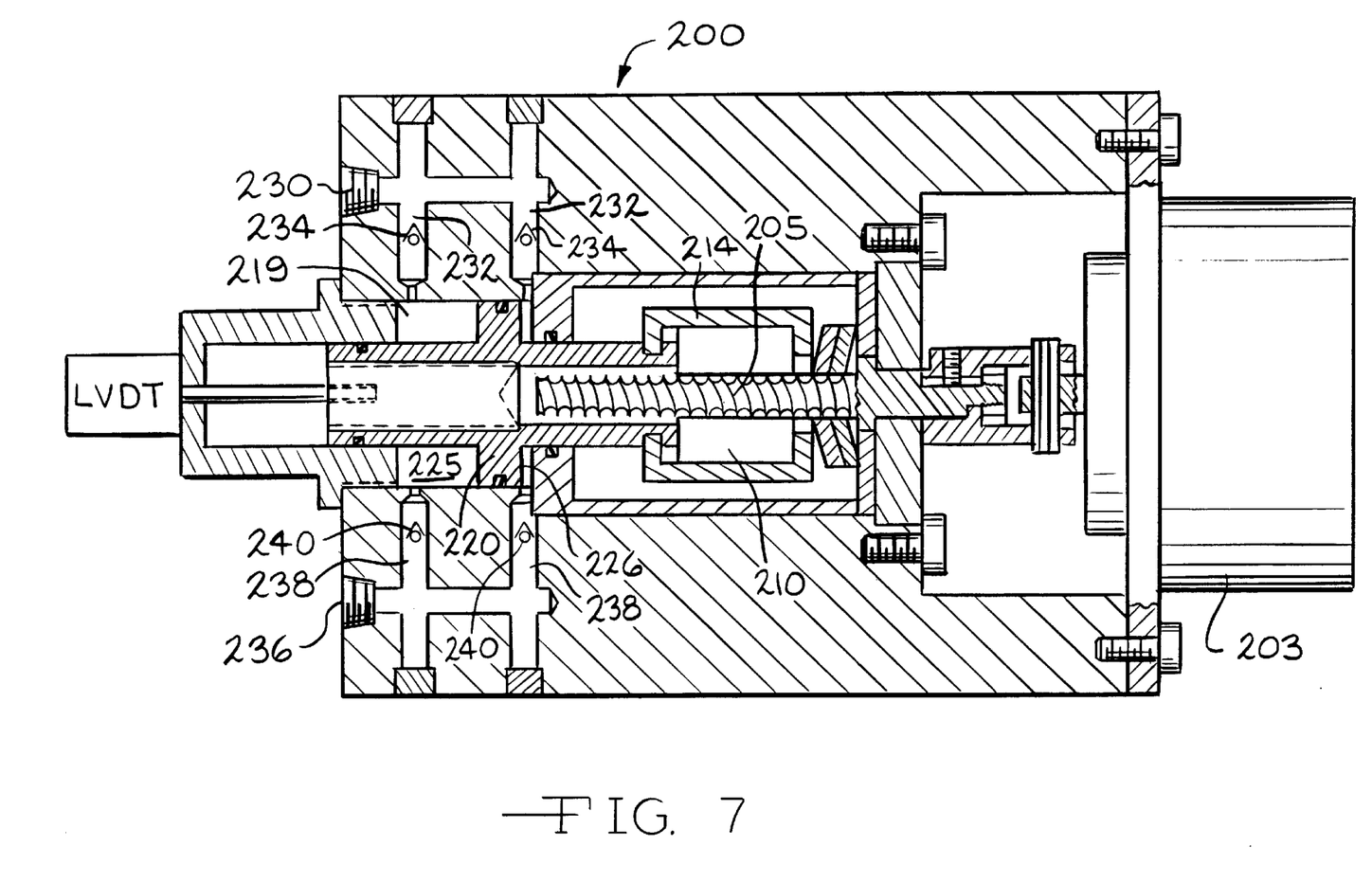
FIG. 7 is an axial sectional view of a first alternate embodiment of a pump assembly according to this invention.

FIG. 7 shows an alternate embodiment of a ball screw pump 200 according to the invention. A piston 220 is slidably disposed in a pressure chamber 219. The piston is connected to the nut 210 via a cage 214. A ball screw 205 is threaded through the nut 210 and is prevented from rotating. The ball screw is connected to a motor 203 which turns the ball screw in both directions. As the ball screw 205 turns, it moves the nut 210 and therefore the piston 220. The piston 220 sealingly divides the pressure chamber 219 into a first chamber 225 and a second chamber 226. An input port 230 is connected to the first and second chambers 225, 226 via conduit 232. One-way check valves 234 are located in conduit 232 which allow fluid to flow through the input port 230 and into the first and second chambers 225, 226 but not in the opposite direction. An output port 236 is connected to the first and second chambers 225, 226 via conduit 238. One-way check valves 240 are located in conduit 238 which allow fluid to flow out of the first and second chambers 225, 226 but not in the opposite direction. As the piston 220 moves to the left, the fluid in the first chamber 225 is expelled through the one-way check valve 240 and out the output port 236, while fluid is drawn into the second chamber 226 through the input port 230 and one-way check valve 234. The piston 220 then moves to the right as shown in FIG. 7 and the fluid in the second chamber 226 is expelled through the one-way check valve 240 and out the output port 236, while fluid is drawn into the first chamber 226 through the input port 230 and one-way check valve 234.

Figure 8:
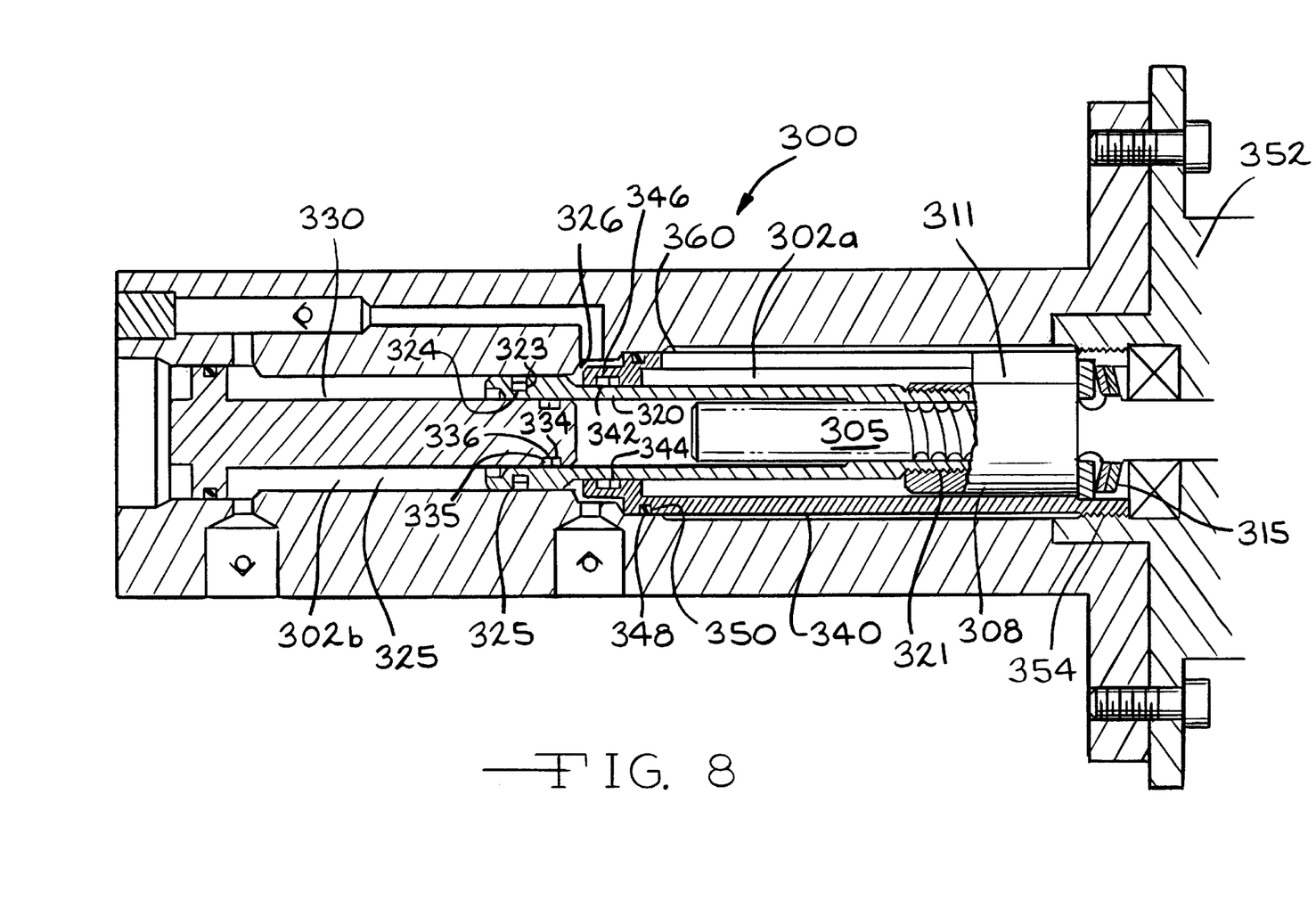
FIG. 8 is an axial sectional view of a second alternate embodiment of a pump assembly according to this invention.

FIG. 8 shows an second alternate embodiment of a ball screw pump 300 according to the invention. This embodiment is similar to the pump 100 shown in FIG. 3 and only the differences will be described. The nut 308 is disposed coaxially about the ball screw 305 similar to pump 100. The piston 320 is coaxially disposed about the ball screw 305 and is attached to the nut 308 by a threaded connection 321. The piston 320 reciprocates in a similar manner as the piston 20 in the pump 100 shown in FIG. 3. An O-ring 323 is disposed in a groove 324 in the outer surface of the end of the piston 320. The piston 320 is disposed in the pressure chamber 302b. A polytetrafluoroethylene (e.g., Teflon) ring 325 is disposed over the O-ring 323. The O-ring 323 and polytetrafluoroethylene (e.g., Teflon) ring 325 act together to seal the end of the piston 320 thereby sealingly separating the pressure chamber 302b into an input chamber 325 and the output chamber 326. The O-ring 323 and polytetrafluoroethylene (e.g., Teflon) ring 325 also reduce the friction between the reciprocating piston 320 and the wall of the pressure chamber 302b.

The piston 320 is coaxially disposed about a cylindrical guide pin 330 in a manner similar to the pump 100 shown in FIG. 3. A polytetrafluoroethylene (e.g., Teflon) ring 334 and an O-ring 335 are disposed in a groove 336 in the guide pin 330 to provide a seal between the guide pin and the piston 320 while reducing the friction therebetween. A sleeve 340 is coaxially disposed about the piston 320. An O-ring 342 and polytetrafluoroethylene (e.g., Teflon) ring 344 are disposed in a groove 346 on an inner surface of the sleeve 340. An O-ring 348 is disposed in a groove 350 in the outer surface of the sleeve 340. The O-ring 342 and polytetrafluoroethylene (e.g., Teflon) ring 344 provide a seal between the piston 320 and the sleeve 340 which, together with the outer O-ring 348, sealingly separate the output chamber 326 from the travel chamber 302a. The sleeve 340 is attached to the motor housing 352 by a threaded connection 354 and does not move during operation of the pump 300. A slot 360 extends axially along the sleeve 340. The nut cap 311 extends into the slot 360 which prevents the nut from rotating as the ball screw rotates. Since the nut 308 is prevented from rotating when the ball screw 308 is turned by the motor (not shown), the nut moves axially along the ball screw and reciprocates the attached piston 320. The belleville springs 315 are attached to the pump body 1 and do not travel with the nut 308, unlike the belleville springs 15 in the pump 100 shown in FIG. 3. The pump 300 operates in a similar manner as pump 100 shown in FIG. 3.

The pump 300 is easier to assemble than the pump 100 shown in FIG. 3. The piston 320 can be screwed into the nut 308 and the motor 352, sleeve 340, ball screw 305, nut 308 and piston 320 can be inserted into the pump body 301 from one direction, as a single unit. The assembly of pump 100 shown in FIG. 3 is more difficult because the piston 20 must be inserted into the pump body from the opposite end as the ball screw 5 and nut 11. The piston 20 must then be joined to the nut 11 and cage 14 while these components are inside the pump body 1 which makes assembly more difficult.

Figure 9:
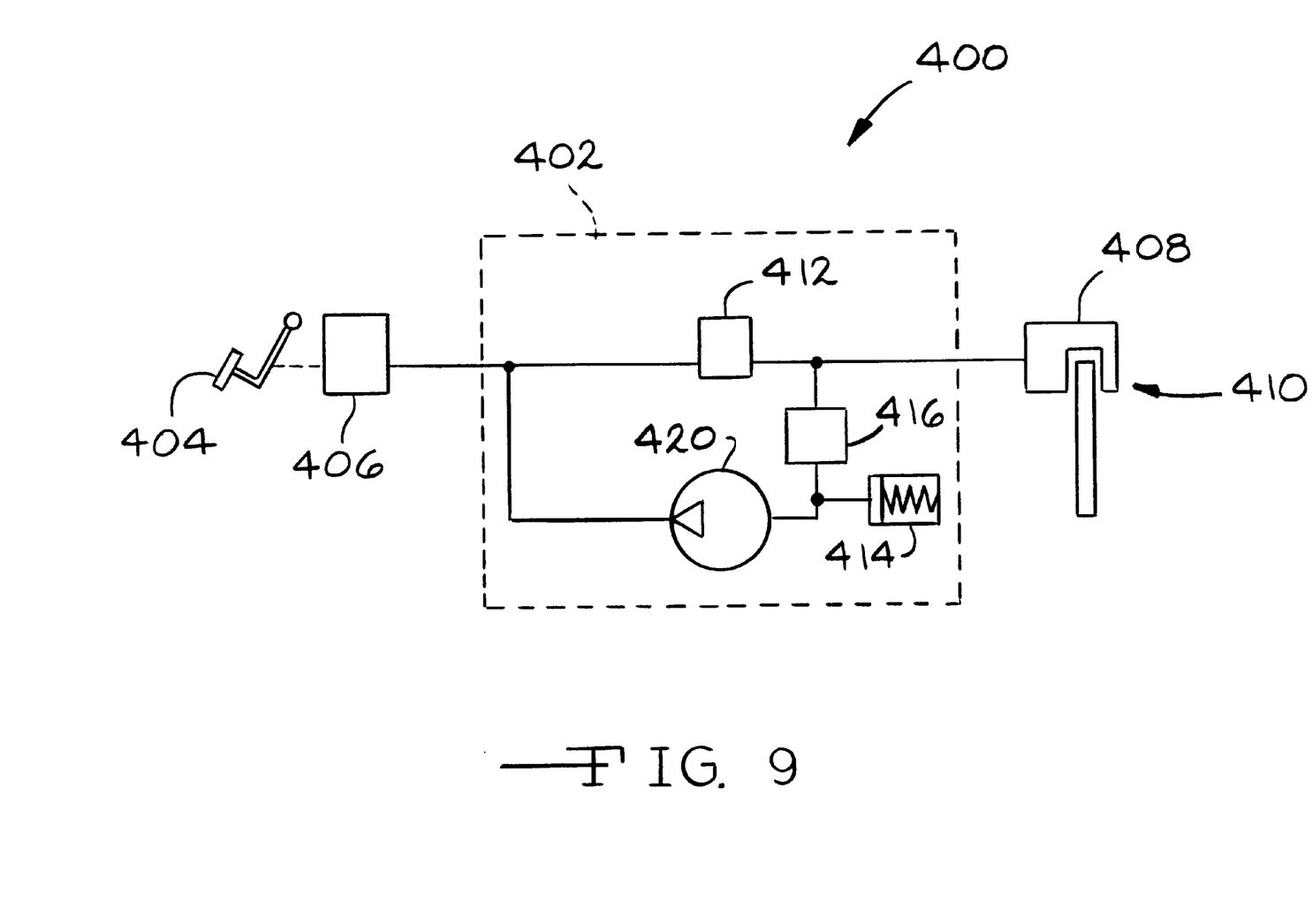
FIG. 9 is a schematic representation of a vehicular braking system in which a pump assembly according to this invention can be incorporated.

A schematic diagram for one wheel of a vehicular antilock braking system 400 is illustrated in FIG. 9. The braking system 400 includes a hydraulic control unit 402 formed as a housing containing valves and other components as described below. For purposes of clarity of illustration, only one set of components is shown in FIG. 9. Typically, however, the hydraulic control unit 402 also embodies corresponding components for other wheels of the vehicle in a well known manner.

The braking system 400 includes a brake pedal 404 connected to master brake cylinder 406. When the brake pedal 404 is depressed, the master cylinder 406 provides pressurized brake fluid to a brake cylinder 408 of a wheel brake assembly 410.

The hydraulic control unit 402 includes a normally open isolation valve 412 disposed between the master cylinder 406 and the brake cylinder 408, a low pressure accumulator 414, a normally closed dump/hold valve 416 disposed between the brake cylinder 408 and the low pressure accumulator 414, and a hydraulic pump assembly 420 connected between the low pressure accumulator 414 and the isolation valve 412.

When the braking system 400 is functioning in an antilock mode, the isolation valve 412 is closed, and the hold/dump valve 416 is opened to permit fluid to flow from the brake cylinder 408 into the low pressure accumulator 414. The pump assembly 420 is operated to pump fluid from the low pressure accumulator 414 back to the inlet side of the isolation valve 412 in a well known manner. According to this invention, any of the pump assemblies 100, 200, 300 can be used for pump assembly 420 in the braking system 400. Furthermore, pump assemblies 100, 200, and 300 can be used in vehicular braking systems having traction control and/or vehicle stability control.

Figure 10:
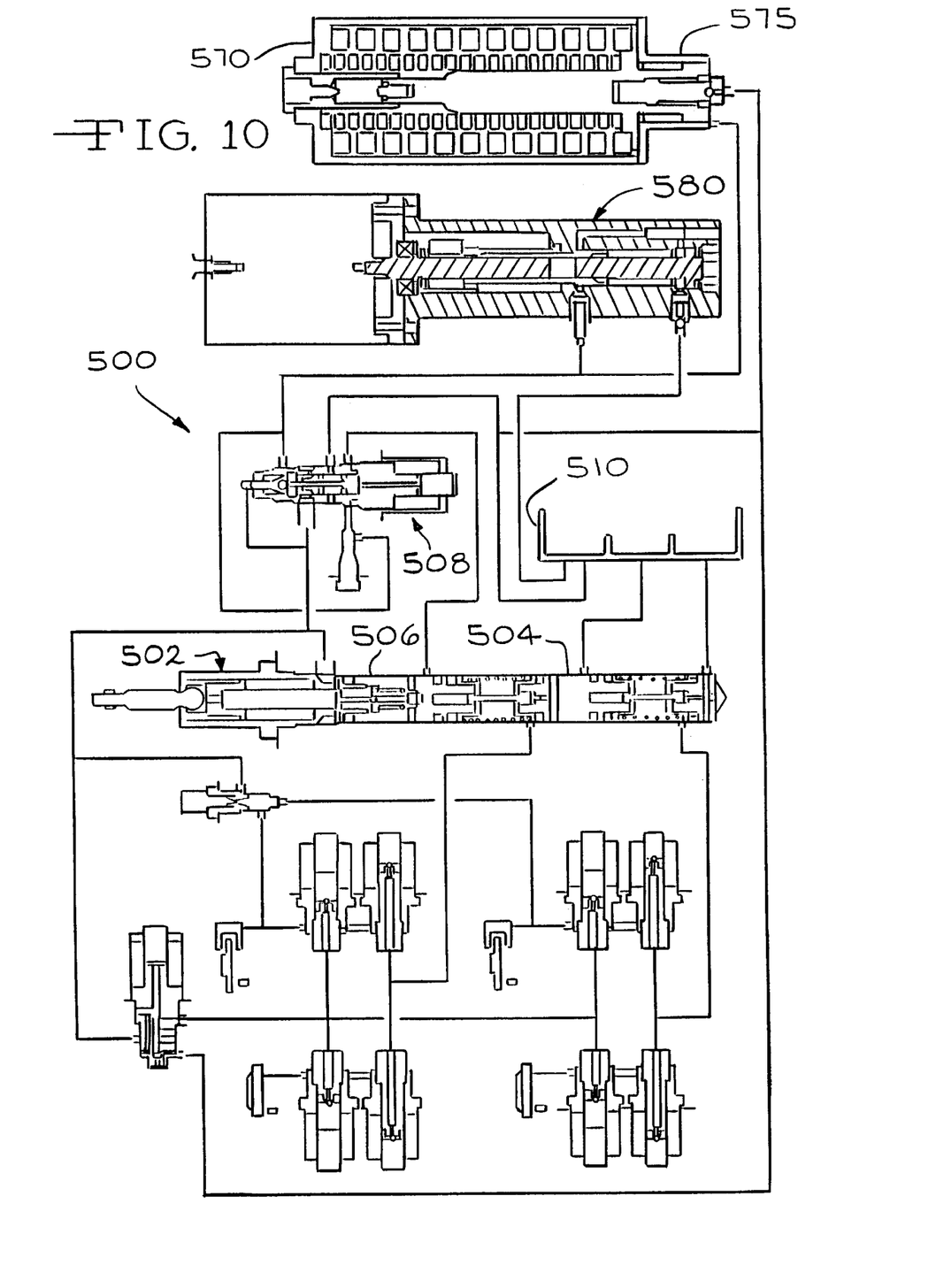
FIG. 10 is a schematic representation of a vehicular braking system having a separate boost valve hydraulically connected to a pump assembly according to this invention.

A schematic representation of a vehicular integrated ABS/TC/VSC braking system 500 having a separate boost is illustrated in FIG. 10. A ball screw pump assembly 580 is used to charge an accumulator 570. In the illustrated embodiment, a spring accumulator 570 includes a pressure responsive bypass valve 575. The ball screw pump assembly 580 is used as the single auxiliary pressure source. Any of the pump assemblies 100, 200, 300 can be used for pump assembly 580.

The braking system 500 includes a master cylinder assembly 502 having a master cylinder 504 and a booster 506. The booster 506 is hydraulically connected to a separate boost valve 508. A reservoir 510 is hydraulically connected to the master cylinder 504. Conduits carry hydraulic brake fluid to isolation and dump valves for each of the vehicle wheels. Braking system 500 is disclosed in U.S. provisional patent application Ser. No. 60/023,939, filed Aug. 14, 1996, assigned to the present assignee, and hereby incorporated by reference.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope. The pump may be used in braking systems, active and partially active suspension systems or any other use requiring pressurized fluid.

What is claimed is:

1. A vehicular anti-lock braking system for hydraulically actuated wheel brakes comprising:

a source of pressurized fluid;

a hydraulic control unit controlling fluid from the source of pressurized fluid to and from the wheel brakes;

at least one fluid control valve mounted on the hydraulic control unit between the source of pressurized fluid and the wheel brakes; and a dual acting ball screw pump assembly, mounted on the hydraulic control unit, selectively providing pressurized fluid to the wheel brakes through the control valve, the ball screw pump assembly including a pump body having an axial bore defining a travel chamber and a pressure chamber, the pressure chamber divided into an input chamber and an output chamber by a reciprocating piston received in the pressure chamber, the input chamber hydraulically connected between the control valve and the wheel brakes, the output chamber hydraulically connected between the source of pressurized fluid and the control valve, and a conduit, formed in the pump body, hydraulically connecting the input chamber to the output chamber, the conduit including a check valve that permits fluid flow only from the input chamber to the output chamber, wherein a maximum volume of the input chamber is greater than a maximum volume of the output chamber.

2. The vehicular braking system defined in claim 1 wherein the ball screw pump assembly provides pressurized fluid to the fluid control valve.

3. The vehicular braking system defined in claim 1 wherein the ball screw pump assembly provides pressurized fluid to an accumulator.

4. The vehicular braking system defined in claim 3 including a boost valve hydraulically connected to the ball screw pump assembly.

5. The vehicular braking system defined in claim 4 including a master cylinder assembly hydraulically connected to the boost valve and hydraulically connected to the hydraulic control unit.

6. The vehicular braking system defined in claim 1 wherein the ball screw pump assembly includes:

an input port and output port formed in the pump body in fluid communication with the pressure chamber;

a check valve provided at the input port that permits only fluid flow into the input chamber;

a check valve provided at the output port that permits only fluid flow from the output chamber; and a ball screw provided in the travel chamber;

wherein the piston is connected to the ball screw so that the piston slidably travels in the pressure chamber as the ball screw is rotated.

7. The vehicular braking system defined in claim 6 including a pin provided in the pressure chamber, wherein the piston is hollow and receives the pin at an open first end and is connected to the ball screw at a second end.

8. The vehicular braking system defined in claim 7 wherein the maximum volume of the output chamber is approximately half the maximum volume of the input chamber.

9. A ball screw pump assembly for a pressurized fluid system comprising:

a pump body having an axial bore defining a travel chamber and a pressure chamber;

a first end of a piston reciprocably received in the pressure chamber and dividing the pressure chamber into an input chamber and an output chamber, an input port and an output port formed in the pump body, wherein the input port is in fluid communication with the input chamber and the output port is in fluid communication with the output chamber;

a conduit, formed in the pump body, hydraulically connecting the input chamber to the output chamber, the conduit including a check valve permitting fluid flow only from the input chamber to the output chamber a ball screw provided in the travel chamber; and a second end of the piston positioned in the travel chamber and connected to the ball screw, the piston slidably traveling in the pressure chamber as the ball screw is rotated, wherein the input chamber has a maximum volume and the output chamber has a maximum volume that is approximately half the maximum volume of the input chamber.

10. The ball screw pump assembly defined in claim 9 wherein the ball screw pump assembly is a dual acting screw pump.

11. The ball screw pump assembly defined in claim 9 wherein the pressure chamber is hydraulically connected to an accumulator of a vehicular braking system.

12. The ball screw pump assembly defined in claim 9 wherein the pressure chamber is hydraulically connected to a fluid control valve of a vehicular braking system.

* * * * *